A. JACKSON.
GARDEN TOOL.
APPLICATION FILED AUG. 14, 1908.
908,266.
Patented Dec. 29, 1908.
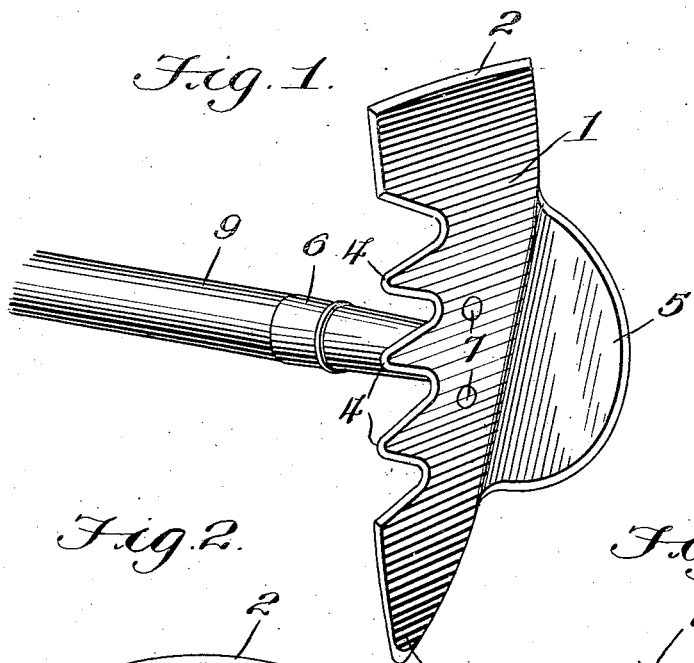
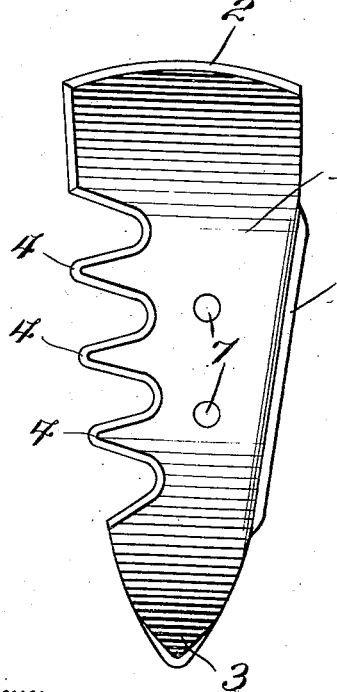
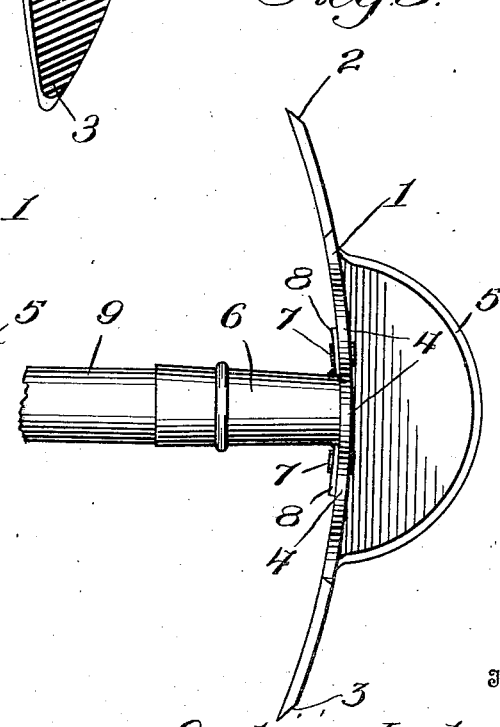
Witnesses
J. T. L. Wright
Inventor
Andrew Jackson,
By Victor J. Evans,
Attorney

UNITED STATES PATENT OFFICE.

ANDREW JACKSON, OF RIVERSIDE, ILLINOIS.

GARDEN-TOOL.

No. 908,266.

Specification of Letters Patent.

Patented Dec. 29, 1908.

Application filed August 14, 1908. Serial No. 448,606.

*To all whom it may concern:*

Be it known that I, ANDREW JACKSON, a citizen of the United States of America, residing at Riverside, in the county of Cook and State of Illinois, have invented new and useful Improvements in Garden-Tools, of which the following is a specification.

This invention relates to garden tools, and one of the principal objects of the same is to provide a tool which can be utilized for various purposes about a garden or lawn.

Another object of the device is to provide a tool which can be used as a rake, a dibble, a hoe and lawn edger by merely turning the handle to bring each one of the tools into position for use.

These and other objects may be attained by means of the construction illustrated in the accompanying drawing, in which,—

Figure 1 is a perspective view of a garden tool made in accordance with my invention. Fig. 2 is a front elevation of the tool. Fig. 3 is a plan view of the same.

Referring to the drawing, the numeral 1 designates a curved plate which may be formed of sheet steel or other metal or cast of the required shape. Said plate is provided upon one end with a hoe blade 2 and upon the opposite end with a dibble 3. Upon one side of the plate rake teeth 4 are formed, and upon the opposite edge of the plate a lawn edger 5 is provided, said edger being bent at right angles to the plate, as shown in the drawing. The edger is substantially semicircular in form and is provided with a suitable beveled cutting edge. As a matter of fact the entire plate may be beveled upon its marginal edge, thus forming a sharpened hoe, a sharpened dibble and rake teeth and an edger having sharpened points and edges. The tool is secured to a suitable socket 6 having laterally extending ears 7 by means of rivets 8 extending through said ears and through the plate. A suitable handle 9 is secured to the socket 6.

A tool such as I have described will be found of great utility in the garden, for the reason that the one tool may be employed for various purposes about the garden or lawn. The cost of manufacture of such a tool is comparatively slight, and each implement is strong, durable and efficient for its purpose.

I claim:—

A garden tool comprising a curved plate having a hoe upon one end, a dibble upon the opposite end, a rake upon one side, and a lawn edger upon the opposite side, said lawn edger having a curved cutting edge and bent at right angles to the plate.

In testimony whereof I affix my signature in presence of two witnesses.

ANDREW JACKSON.

Witnesses:
 MARIE PERKINS,
 H. G. BATCHELOR.